United States Patent [19]
Weissmann

[11] 3,786,673
[45] Jan. 22, 1974

[54] DETERMINATION OF MECHANICAL DESIGN PROPERTIES OF ELASTIC MATERIALS

[75] Inventor: Gerd Friedrich Horst Weissmann, Florham Park, N.J.

[73] Assignee: Bell Telephone Laboratories, Incorporated, Murray Hill, N.J.

[22] Filed: Mar. 15, 1972

[21] Appl. No.: 234,781

[52] U.S. Cl. .................................. 73/67.2, 73/100
[51] Int. Cl. ........................ G01m 7/00, G01n 3/38
[58] Field of Search ......... 73/67.1, 67.2, 67.3, 67.4, 73/91, 99, 100

[56] References Cited
UNITED STATES PATENTS

| | | | |
|---|---|---|---|
| 2,283,453 | 5/1942 | Norton | 73/67.1 |
| 3,319,460 | 5/1967 | Barigant | 73/67.2 |
| 3,417,608 | 12/1968 | Barigant | 73/67.1 |
| 3,610,027 | 10/1971 | Woboditsch | 13/67.2 |

*Primary Examiner*—Charles A. Ruehl
*Attorney, Agent, or Firm*—John C. Fox

[57] ABSTRACT

Mechanical design properties of elastic materials including design stress and design modulus are determined from the energy dissipation per cycle and total elastic energy of a sample used as a spring in a one degree of freedom oscillator whose fixed end is subjected to a transient displacement during each cycle. The energy dissipation per cycle and total elastic energy are related to the steady state amplitude and frequency, respectively, of the oscillator.

7 Claims, 4 Drawing Figures

DETERMINATION OF MECHANICAL DESIGN PROPERTIES OF ELASTIC MATERIALS

BACKGROUND OF THE INVENTION

This invention relates to an apparatus and method for determining mechanical design properties of elastic materials by measuring the energy dissipation per cycle and elastic energy of a sample in steady state cyclic bending or torsion of constant amplitude.

Most mechanical and structural parts are designed to operate in the elastic range of the materials used whether such parts be heavy girders of highway bridges or simple mechanical springs for use in communications equipment. For an adequate analysis of these parts, the modulus of elasticity and a design stress of the materials must be available. These values are traditionally determined by means of tension tests in which a stress-strain curve for the material is usually obtained. The slope of the curve in the elastic range of the material is designated as the elastic modulus. The intersection of a line parallel to this slope with the stress-strain curve then determines the offset yield stress for a specified offset, which is used as the permissible stress. Due to factors such as experimental error and material characteristics, the stress-strain relationship may often deviate somewhat from linearity, requiring a degree of subjectivity and consequently a significant probability of error in the determination of the elastic modulus and accordingly, the yield stress. Furthermore, the 0.01 percent yield stress, although generally considered to indicate the onset of permanent deformation and to be a reasonable approximation of the proportional limit, nevertheless is generally not reported by material suppliers since a small error in the determination of the elastic modulus often leads to a large error in the determination of the 0.01 percent yield stress by the above method. Additional complicating factors include, for example, the following: (1) for some high strength materials the 0.01 percent yield stress represents reversible changes in the geometry of the specimen rather than the onset of permanent deformation, (2) due to the Bauschinger effect certain strain-hardened materials may exhibit lower 0.01 percent yield stresses in compression than in tension, and (3) repeated stressing may cause cyclic hardening or softening of some materials, resulting in variations in design properties depending upon the mechanical history of the sample.

Due in part to the recognition of the limitations of tension testing for the determination of the elastic modulus of materials, various dynamic testing methods have been explored. For example, frequency measurements of both free vibrations and forced harmonic vibrations of a sample have been used to obtain values for the elastic modulus. At present, there exists no suitable alternative for tension tests for the determination of permissible design stresses such as the 0.01 percent yield stress.

SUMMARY OF THE INVENTION

Mechanical design properties of elastic materials including design modulus and design stress may readily be determined by measuring the elastic energy and the energy dissipation per cycle, respectively, of a strip or wire sample in cyclic bending or torsion as the spring in a one degree of freedom oscillator whose free end has a weighted part attached and whose fixed end is subjected to at least one transient displacement during each bend or torsion cycle. Such an arrangement results in the achievement of a steady state oscillation of constant amplitude. The design modulus is then a function of the total elastic energy of the sample which is a function of the frequency of rotation according to the following relationship:

$$\bar{E} = 473.7 \; lJ/bh^3 \; f^2 \tag{1}$$

wherein
$\bar{E}$ is the design modulus,
$l$ is the sample length,
$b$ is the sample width,
$h$ is the sample thickness,
$J$ is the mass moment of inertia of the attachment part, and
$f$ is the frequency of rotation of the part.

In a preferred embodiment the mass moment of inertia of the attachment part is chosen so as to achieve a low to moderate frequency of rotation (e.g., 0.5 to 200 Hertz) so as to minimize energy losses due to air friction and to avoid the dependence of energy dissipation per cycle upon the strain rate which would occur for some materials at higher frequencies of rotation.

The magnitude of the transient displacement determines the energy input into the system per cycle which under a steady state condition equals the energy dissipation per cycle. For stresses above the onset of permanent deformation, the energy dissipation per cycle is an exponential function of the total strain or total stress, which is determined by the amplitude of the angle of rotation of the attachment part.

The magnitude of the transient displacement determines the maximum permanent strain or offset for the design stress, and for the case of bending is determined according to the following relationship:

$$\theta_o = 2l/h \; \Delta\epsilon \tag{2}$$

where
$\theta_o$ is the transient displacement,
$l$ is the length of the sample,
$h$ is the thickness of the sample, and
$\Delta\epsilon$ is the design offset.

The design stress is then a function of the maximum amplitude achieved for a steady state condition according to the following relationship:

$$\sigma_1 = \bar{E} \; (\epsilon_1 - \Delta\epsilon) \tag{3}$$

where
$\sigma_1$ is the design stress,
$\bar{E}$ is the design modulus,
$\Delta\epsilon$ is the offset, and
$\epsilon_1$ is the design strain which is a function of the steady state amplitude of the angle of rotation according to the relationship:

$$\epsilon_1 = 0.00759 \; h/l \; \phi_a \tag{4}$$

where
$\phi_a$ is the steady state or maximum amplitude.

Other design properties which may be determined from the frequency and/or amplitude values include bending stiffness per unit width, permissible bending moment per unit width, and the maximum modulus.

As used herein, the term "elastic material" is meant to refer to any material which exhibits at least some elastic behavior under the specified test conditions.

DETAILED DESCRIPTION OF THE INVENTION

Figure 1:
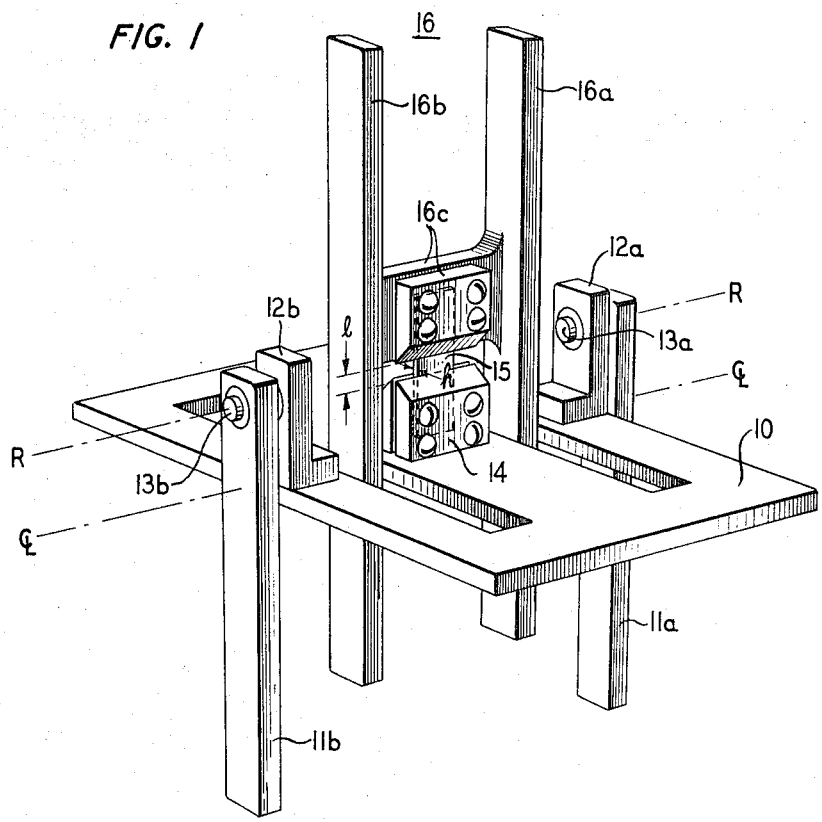
FIG. 1 is a perspective view of the mechanical parts of one embodiment of an apparatus suitable for carrying out bend tests in accordance with the invention.

Referring now to FIG. 1, there is shown one embodiment of an apparatus for the evaluation of metal strips subjected to substantially uniform bending. Base plate 10 is rotatably mounted upon supports 11a and 11b by means of blocks 12a and 12b attached to the base plate and supported by bearings 13a and 13b. Clamping support 14 on base plate 10 supports sample strip 15 in a rest position while attachment part 16 is attached to the upper free end of strip 15 by means of clamp 16c. Bars 16a and 16b of attachment part 16 extend through slot shaped apertures which are formed by base plate 10. It is preferred to choose sample dimensions such that the length $l$ is at least 12 times the thickness $h$ in order to reduce the effect of energy losses in the clamps. A spacer may be used when clamping attachment part 16 to the upper end of the sample in order to insure a uniform length from sample to sample. The length, therefore, is the exposed length and does not include those portions of the sample between the clamps.

The mass moment of inertia of the attachment part 16 may be either calculated or determined experimentally by well known techniques.

In general, where samples of different thicknesses are to be tested in the same apparatus, it is preferred to have different attachment parts for different standard thicknesses so as to achieve the desired low frequency of the bending. In addition, for some materials, such as certain viscoelastic materials, design properties may be strain rate dependent. In such cases such dependence may be determined by determining the design properties at various frequencies using the different attachment parts. In addition, it has been found advantageous to achieve a relatively large mass moment of inertia for a relatively low weight of the attachment part since such results in low normal stresses compared to bending stresses.

The purpose of blocks 12a and 12b is to enable positioning of the sample so that its center lies upon the axis of rotation R of the base plate in order to reduce the effect of gravity and nonlinearities of the apparatus for angles of rotation of the sample up to 30° to an insignificant amount. The axis of rotation is thus displaced from but parallel to the center line $\phi$ of the base plate.

Figure 2:
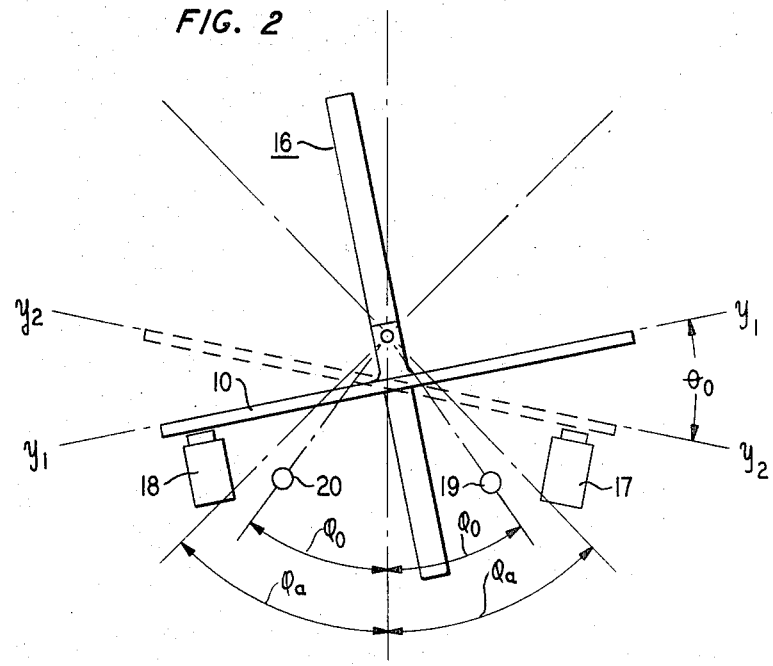
FIG. 2 is a schematic diagram depicting the operation of the apparatus of FIG. 1 as viewed along the axis of rotation of the apparatus.

Referring now to FIG. 2, there is shown schematically the operation of the apparatus of FIG. 1. Base plate 10 is held in a fixed position $y_1$ by solenoid 18. Once the sample has been clamped onto base plate 10 and part 16 has been attached to the free end of the sample, attachment part 16 is then set in motion by moving bars 16a and 16b from the rest position shown in the Figure past optical switch 19 causing the actuation of solenoid 17 and the rotation of base plate 10 to position $y_2$ by an amount equivalent to $\theta_o$. Part 16 then returns of its own momentum, passing optical switch 19 again in the opposite direction, but resulting in no change in the position of base plate 10 until the part passes optical switch 20 causing the actuation of solenoid 18 and the rotation of base plate 10 back to position $y_1$ by an amount equal to $\theta_o$. When bars 16a and 16b pass optical switch 20 again in the opposite direction, no change occurs in the position of base plate 10 until optical switch 19 is again actuated. A simple logic circuit controls the interaction between the optical switches and the solenoids. After a few cycles, typically about 10, the angle of rotation of the attachment part reaches a maximum value of $\phi_a$, indicating that a steady state condition has been reached. The positions of the optical switches are adjustable. The positions of the solenoids are also adjustable so that the angle of rotation $\theta_o$ of base plate 10 is also adjustable. As stated above, the angle $\theta_o$ is determined by the offset desired for the design stress according to equation (2) above.

In addition to the values for design stress and design modulus, the following equations may be used to determine additional design properties:

bending stiffness per unit width, $$C_o = 39.5 \ J/b \ f^2;$$

(5)

bending moment per unit width, $$M_1 = 0.0175 \ C_o \ (\phi_a - \theta_o); \text{ and}$$

(6)

maximum modulus, $$E = \frac{\bar{E}}{1 - \frac{\theta_o}{\phi_a}}$$

(7)

EXAMPLE

Using apparatus similar to that depicted in FIGS. 1 and 2, design properties of several alloys were determined. Table I shows the alloys and their temper, the sample dimensions $b$, $h$, and $l$, the measured angles of rotation of the samples $\phi_a$, the measured frequency $f$, the design strain $\epsilon_1$, the design modulus $\bar{E}$, determined by the bend test, the design stress $\sigma_1$ for an irreversible strain of $\Delta\epsilon = 0.0001$, determined by the bend test, and the elastic modulus $E^*$ determined by conventional tension testing and the 0.01 percent yield stress $\sigma_{0.01}$ determined by conventional tension testing, all values reported both in metric and U. S. customary units.

A single attachment part was used having the mass moment of inertia shown at the top of Table I.

TABLE I: [$J = 2.15 \times 10^{-3} (Nm/m^2) = 0.019$ (lbs.in/$m^2$)]

Section 1

| MATERIAL | $l$ mm (in.) | $h$ mm ($10^{-3}$in) | $b$ mm (in.) |
|---|---|---|---|
| Cupro-nickel CA-725 95% Reduction | 3.162 (0.1245) | 0.156 (6.15) | 12.7 (0.5) |
| Cupro-nickel CA-725 60% Reduction | 3.162 (0.1245) | 0.157 (6.20) | 12.7 (0.5) |
| Cupro-nickel CA-725 37% Reduction | 3.162 (0.1245) | 0.151 (5.95) | 12.7 (0.5) |
| Cupro-nickel CA-725 0% Reduction | 3.162 (0.1245) | 0.161 (6.35) | 12.7 (0.5) |
| Stainless Steel 301 | 3.162 (0.1245) | 0.131 (5.15) | 14.29 (0.5625) |
| Copper Beryllium CA-172 96.5% Reduction | 3.162 (0.1245) | 0.267 (10.50) | 11.99 (0.4722) |
| Aluminum 1100 H14 | 6.363 (0.2505) | 0.300 (11.80) | 12.31 (0.485) |
| Phosphor Bronze CA-510 | 3.162 (0.1245) | 0.263 (10.35) | 12.22 (0.481) |

Section 2

| MATERIAL | $\phi_a$ deg. | $f$ Hz | $\epsilon_1$ $10^{-3}$ |
|---|---|---|---|
| Cupro-nickel CA-725 95% Reduction | 11.0 | 1.41 | 4.12 |
| Cupro-nickel CA-725 60% Reduction | 9.0 | 1.45 | 3.39 |
| Cupro-nickel CA-725 37% Reduction | 8.5 | 1.36 | 3.08 |
| Cupro-nickel CA-725 0% Reduction | 3.0 | 1.49 | 0.88 |
| Stainless Steel 301 | 12.0 | 1.27 | 3.77 |
| Copper Beryllium CA-172 96.5% Reduction | 15.0 | 3.23 | 9.43 |
| Aluminum 1100 H14 | 3.5 | 1.818 | 1.25 |
| Phosphor Bronze CA-510 | 10.5 | 2.80 | 6.63 |

Section 3

| MATERIAL | $\bar{E}$ GN/$m^2$ ($10^3$ksi) | $\sigma_1$ MN/$m^2$ (ksi) | $E^*$ GN/$m^2$ ($10^3$ksi) | $\sigma_{0.01}$ MN/$m^2$ (ksi) |
|---|---|---|---|---|
| Cupro-nickel CA-725 95% Reduction | 133 (19.2) | 534 (77.1) | 129 (18.7) | 465 (67.4) |
| Cupro-nickel CA-725 60% Reduction | 138 (19.8) | 463 (65.3) | 135 (19.6) | 439 (63.6) |
| Cupro-nickel CA-725 37% Reduction | 136 (19.7) | 406 (58.7) | 138 (20.0) | 400 (58.0) |
| Cupro-nickel CA-725 0% Reduction | 135 (19.4) | 143 (20.6) | 126 (18.3) | 131 (19.0) |
| Stainless Steel 301 | 162 (23.5) | 594 (86.3) |  | ~552* (~80.0) |
| Copper Beryllium CA-172 96.5% Reduction | 147 (21.4) | 1400 (203.2) | 148 (21.5) | 1180 (171.0) |
| Aluminum 1100 H14 | 64 (9.4) | 74 (10.8) | 69 (10.0) |  |
| Phosphor Bronze CA-510 | 114 (16.5) | 741 (10.7) | 116 (16.8) | 717 (10.4) |

*40% of Tensile Strength

Figure 3:
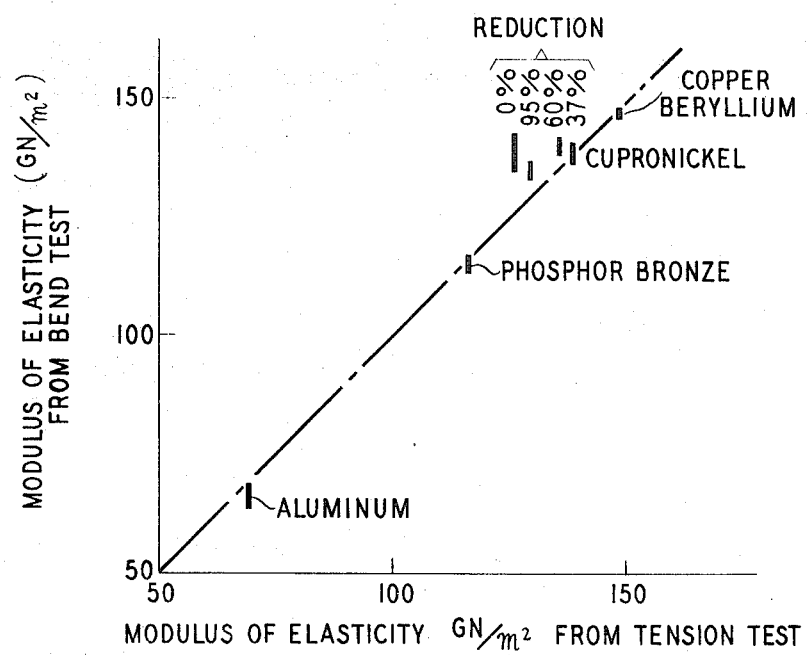
FIG. 3 is a graph comparing the modulus of elasticity as determined from tension tests with the modulus of elasticity as determined from the bend test of the invention for several metal alloy materials.

FIG. 3 is a graph comparing the elastic moduli determined by means of the bend tests of the invention and tension tests. As may be seen, there is good agreement between these methods. In addition, for the cupro-nickel alloys the bend tests yielded a smaller variation in values than did the tensile tests as may be verified from the values reported in Table I.

Figure 4:
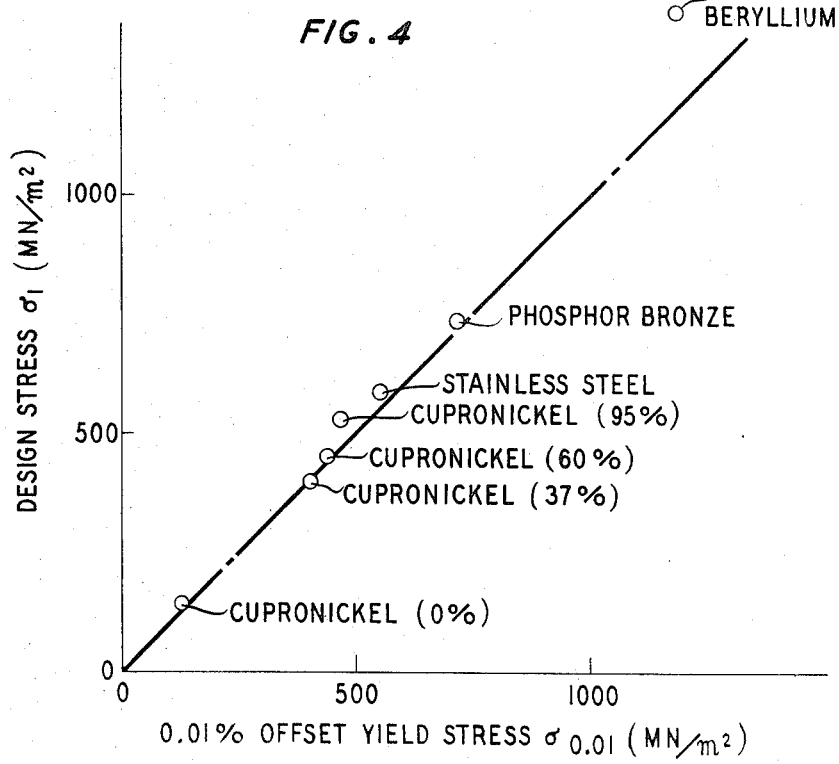
FIG. 4 is a graph comparing the 0.01 percent offset yield stress as determined by tension tests with the design stress for a 0.01 percent offset as determined by the bend test of the invention for various metal alloy materials.

FIG. 4 shows a comparison of the design stress determined by the bend test of the invention and the 0.01 percent offset yield stress determined by tensile tests. As may be seen, for metals with tempers indicating relatively small amounts of cold work, there is good agreement between the values of both methods, indicating that deviations from linearity measured by the tensile tests were caused by permanent deformation of the sample. For the cupro-nickel alloy and the beryllium-copper alloy having a 95 percent cold reduction, the bend test measured higher stress values than did the tension test, indicating that the deviation from linearity observed in the tension tests was in part reversible and that the beginning of permanent deformation takes place at higher stress levels.

The results shown in Table I and FIGS. 3 and 4 were obtained for less than 200 cycles of operation of the bend test. The 95 percent reduced cupro-nickel alloy was subjected in a separate bend test to 2,500 cycles resulting in a significant reduction in the design stress from 534 MN/$m^2$ (77.1 ksi) to 469 MN/$m^2$ (68.1 ksi) indicating cyclic softening.

The invention has been described in terms of a limited number of preferred embodiments. However, it is to be understood that other embodiments which rely upon the principles set forth herein are part of the invention. For example, measurement of elastic energy and the energy dissipation per cycle of a wire or rod sample in bending or torsion in order to derive values of design properties for such samples is contemplated. Furthermore, the orientation of the sample may be horizontal, rather than vertical. For example, the bend axis of a strip could be normal to a horizontal plane.

What is claimed is:

1. An apparatus for determining the mechanical design properties of elastic materials comprising:

means for supporting a sample, the means holding the sample at one end thereof, a weighted part attached to the other end of the sample, and means for producing a periodic transient displacement of the supporting means of a variable magnitude so as to induce periodic motion of the sample, and means for actuating the displacement means in response to the sample motion, the actuating means comprising the weighted part attached to the other end of the sample and switching means responsive to the motion of the weighted part operatively connected to the displacement means, so as to achieve a steady state oscillation of the sample.

2. The apparatus of claim 1 in which the sample is a strip having a length $l$ at least 12 times its thickness $h$ and in which the oscillation comprises a uniform cyclic bending of the strip about a bend axis transverse to the length of the strip.

3. The apparatus of claim 2 in which:

the sample strip supporting means comprises at least two supporting members, a base plate, two blocks mounted near opposite edges of the base plate and on a center line through the center of gravity of the base plate, the blocks rotatably mounted on the supporting members so as to achieve rotation of the base plate about an axis of rotation displaced from but parallel to the center line of the base plate, the base plate defining two parallel slot shaped apertures, the long dimensions of the apertures being normal to the axis of rotation of the base plate, and a first holder mounted on the base plate between the apertures and on the center line of the base plate;

the weighted part comprises a second holder and two elongated members of substantially equal weight and dimensions attached to opposite ends of the holder and extending through the apertures, the center of gravity of the weighted part being approximately on the displaced axis of rotation of the base plate, and the displacement means comprises at least one solenoid movably mounted near one end of the base plate, so that actuating the solenoid produces an attractive force upon the base plate and causes a resultant rotation of the base plate toward the solenoid.

4. The apparatus of claim 3 in which the means for actuating the solenoid comprises at least one optical switch movably mounted within the path of rotation of the attachment part and circuit means for controlling the interaction between the optical switch and the solenoid so that traversal of the optical switch by the weighted part results in the alternate actuation and deactuation of the solenoid.

5. A method for determining the mechanical design properties of elastic materials comprising:
supporting a sample at one end,
attaching a weighted part to the other end of the sample,
producing a periodic transient displacement of the supported end of the sample so as to induce periodic motion of the sample, the magnitude of the displacement being of a predetermined value, and the period of the displacement being determined by the period of the sample, so as to achieve a steady state oscillation of the sample.

6. The method of claim 5 in which the transient displacement produced is angular, and its magnitude is determined by the relationship:

$$\theta_a = 2l/h \, \Delta\epsilon$$

where
$l$ is the length of the sample,
$h$ is the thickness of the sample, and
$\Delta\epsilon$ is the desired maximum permanent deformation, and in which the design modulus is related to the steady state frequency of oscillation of the sample $$\bar{E} = 473.7 \, lJ/bh^3 \, f^2$$

wherein
$\bar{E}$ is the design modulus,
$l$ is the sample length,
$b$ is the sample width,
$h$ is the sample thickness,
$J$ is the mass moment of inertia of the attachment part, and
$f$ is the measured frequency of rotation of the part,
and the design stress is related to the steady state amplitude of oscillation of the sample according to:

$$\sigma_1 = \bar{E} \, (\epsilon_1 - \Delta\epsilon)$$

where
$\sigma_1$ is the design stress,
$\bar{E}$ is the design modulus,
$\Delta\epsilon$ is the offset, and
$\epsilon_1$ is the design strain which is a function of the steady state amplitude of the angle of rotation according to the relationship:

$$\epsilon_1 = 0.00759 \, (h/l) \, \phi_a$$

where
$\phi_a$ is the steady state or maximum amplitude.

7. The method of claim 5 in which the sample is a strip having a length at least 12 times its thickness $h$ and in which the oscillation comprises a uniform cyclic bending of the strip about a bend axis transverse to the length of the strip.

* * * * *